United States Patent

[11] 3,628,579

[72] Inventor Edward Noland Roche
 5 Hickory Hill Road, Cockeysville, Md. 21030
[21] Appl. No. 877,616
[22] Filed Nov. 18, 1969
[45] Patented Dec. 21, 1971

[54] PLASTIC LAMINATE TRIMMER
 7 Claims, 6 Drawing Figs.
[52] U.S. Cl. ..................................... 144/134 E, 90/12
[51] Int. Cl. ..................................... B27c 5/10, B23d 9/00
[50] Field of Search........................... 144/134 E, 136 C, 144, 136, 117 B; 90/12

[56] References Cited
 UNITED STATES PATENTS
 2,635,655 4/1953 Linstead .................. 144/134 E
 3,119,207 1/1964 Nall ......................... 144/134 E Primary Examiner—Donald R. Schran
Attorney—Walter G. Finch ABSTRACT: A novel method and tool for fitting laminate to substructure is disclosed. The provision of pad gauges to a motorized routing tool operating at a beveling angle allows the tool to follow assembled substructure and bevel the edge of the laminate for more exact conformance and fit without the necessity for also beveling the substructure.

INVENTOR
E. N. ROCHE

BY Walter G. Finch
ATTORNEY

PLASTIC LAMINATE TRIMMER

This invention relates generally to woodworking tools, and more particularly it pertains to a portable motor-driven plane for the express purpose of beveling laminate facings in situ.

Because of the difficulty of exactly measuring and conforming a laminate facing to surfaces, they are usually trimmed to size after attachment to the substructure. When this is done for mitered edges, such as at the side and top coverings of counters and the like, the beveling operation of necessity, extends into the substructure and requires an expensive miter joint in this portion too.

It is an object of this invention, therefore, to provide a chamfering machine for forming an inwardly sloping bevel to the edges of laminate facings in exact conformance to the edge of a substrate.

Another object of this invention is to provide a new method for forming a seamless edge for veneer-surfacing articles which are already assembled.

Other objects and attendant advantages of this invention will become more readily apparent and understood from the detailed specification and accompanying drawings in which.

Figure 1:
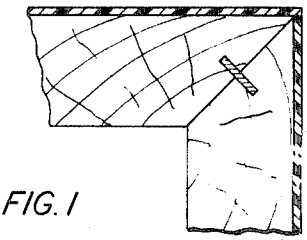
FIG. 1 is a side elevation of a seamless edge for a laminate coated object as made by conventional practices.

Where laminate facings are used, it has been the practice in the past to apply the laminate to the unassembled pieces and trim both the laminate and substrate to a bevel in preparation for a seamless miter joint. As shown in FIG. 1, the resulting miter of the substrate required an expensive subsequent assembly process to make the joint.

Figure 2:
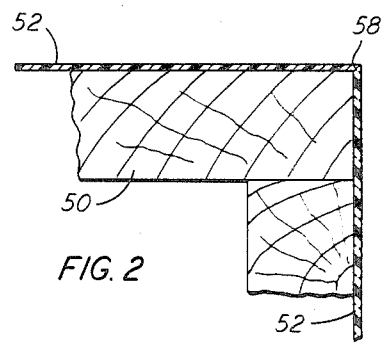
FIG. 2 is a view similar to FIG. 1 showing the new method for constructing seamless edges.

It is much less expensive to make an overlap joint in the substrate as shown in FIG. 2, but until now an inward bevel in exact conformance with the contour of the underlying edge was very difficult to make in the laminate.

Figure 4:
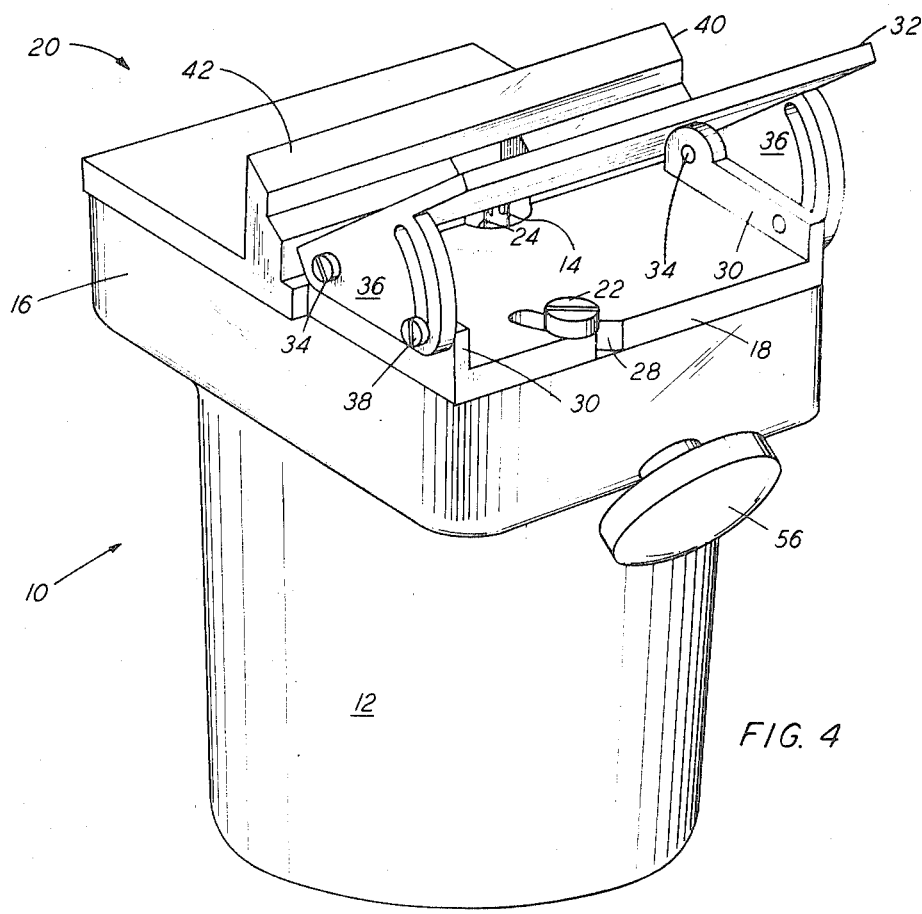
FIG. 4 is a perspective view of the tool.
Figure 5:
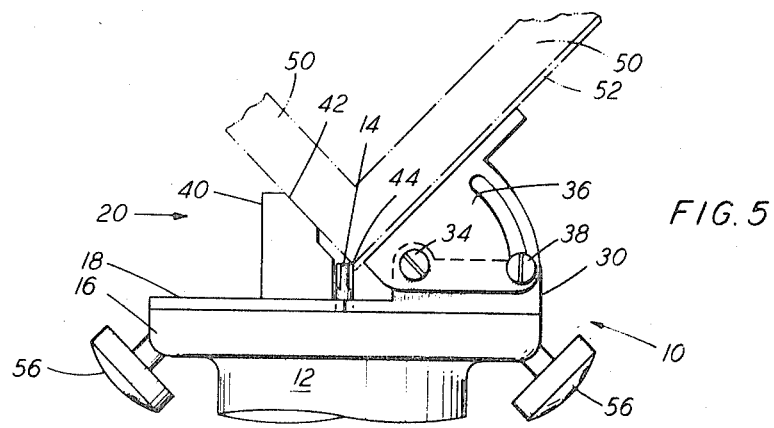
FIG. 5 is a side elevation showing details of the gauging and cutting portions of the tool.

A tool expressly designed for this purpose is shown in FIG. 4 and 5, as indicated by reference numeral 10. This tool 10 consists of a motor power unit 12 having a small diameter cylindrical rotating cutting tool 14 extending normally from a faceplate 16. Upon this faceplate 16 there is mounted a guide structure indicated generally by reference numeral 20. This guide structure 20 has a flat base 18 which is held in contact with the faceplate 16 by means of an adjusting screw 22.

Figure 6:
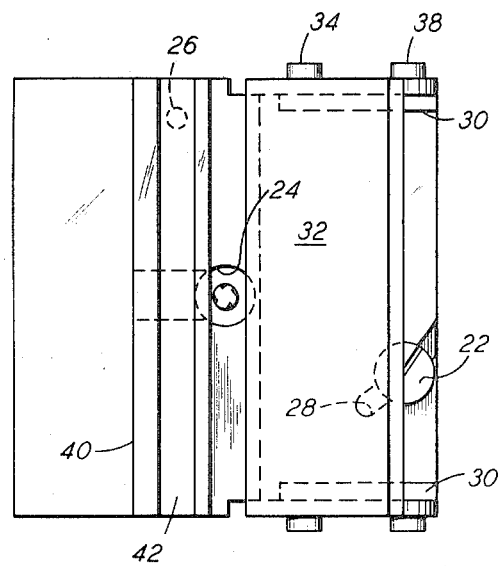
FIG. 6 is a plan view looking directly into the axis of the cutter.

The base 18 has an oversize clearance hole 24 about the base of cutter 14. It also has a concealed pivot stud 26 which extends down into the faceplate 16 at a point diagonally opposite to the adjusting screw 22 as shown in FIG. 6. Adjusting screw 22 extends through a curved slot 28 formed to the radius from the pivot stud 26. Thusly, the guide structure 20 may be moved as a whole to a limited extent about the cutter 14 and locked in a desired position with the adjusting screw 22.

One half of the base 18 is provided with upstanding ears 30 at each side. An adjustable pad 32 is pivotally mounted upon these ears 30 with screws 34. Downwardly extending checks 36 of the pad 32 are slotted on a radius from the screws 34 and there provided with locking screws 38 threaded into the ears 30.

A fixed guide pad 40 extends on a line parallel to the adjustable pad 32 on the opposite of the cutting tool 14 and secured to the base 18.

This pad 40 has a raised guide face 42 that slopes at a 45° plane which extended, coincides with the far edge 44 of the cutting tool as best shown in FIG. 5.

Figure 3:
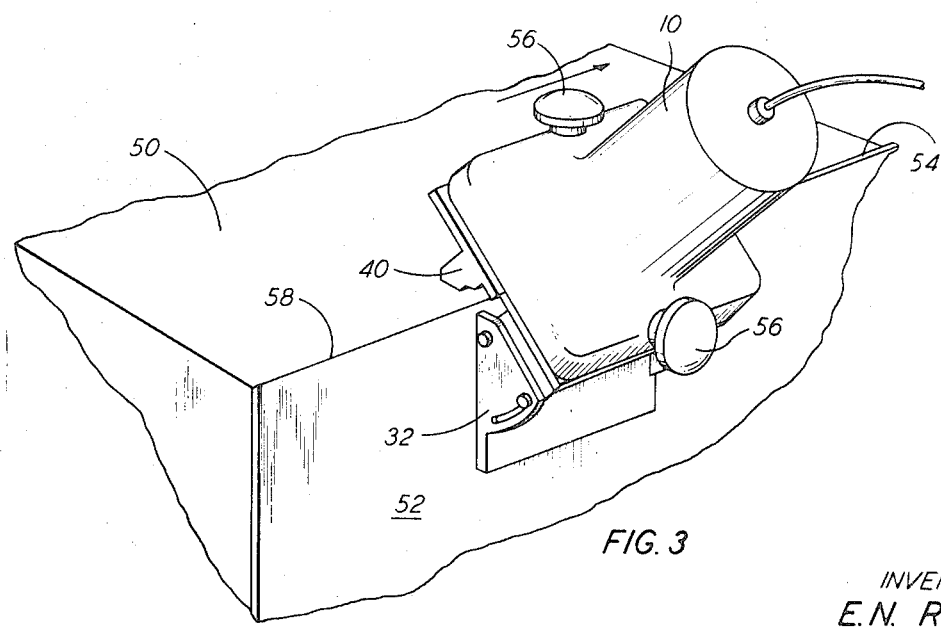
FIG. 3 is a perspective view showing the novel tool of this invention forming the inwardly sloping bevel in preparing a seamless joint in laminate facings.

According to this invention, the substructure 50 of the work is first permanently secured together. Then individually, as shown in FIG. 3, each facing sheet of laminate 52 is temporarily clamped to the face to be covered with the edge to be beveled protruding as shown by reference numeral 54.

The tool 10 is then applied to this edge 54 and moved with the handles 56 as shown by the arrow, until the pads 32 and 40 are both in contact with the work and the cutting action ceases. An inwardly sloping bevel 58 which exactly conforms with the edge of the substrate 50 results. The sheet of laminate 52 is now removed and reserved for later permanent attachment and the process repeated for the other facings.

If corners other than 90° are to be processed, the adjustable pad 32 can be set for making a bevel of other than 45° as required. The adjustment screw 22 provides an adjustable depth of cut to accommodate various thicknesses of laminate. It should be noted the tool 10 and process described are well suited for refacing old furniture with new wood veneer or a plastic laminate, such as Formica.

Obviously many modifications and variations of the present invention are possible in light of the above teachings. It is, therefore, to be understood that within the scope of the appended claims the invention may be practiced otherwise than as specifically described.

I claim:

1. A portable motor-driven laminate chamfering machine for use in forming an inwardly sloping bevel to the edge of a laminate facing in exact conformance to the edge of a substrate, comprising, structure defining a motor power unit having a faceplate and a cylindrical rotating cutting tool extending normally through said faceplate from said motor power unit, guide structure mounted upon said faceplate, said guide structure comprising of a base positioned adjacent said faceplate, said base having an oversize clearance aperture positioned about the base of said cutting tool, adjustable locking means for holding said base in contact with said faceplate, means for pivotally mounting said base to said faceplate at a point diagonally opposite to said adjusting means, said base having a curved slot formed therein to the radius from said pivot means, with said adjustable locking means extending through said curbed slot so that said guide structure may be moved as a whole to a limited extent about said cutting tool and locked in a desired position with said adjustable locking means, vertically extending means provided at each side of substantially one-half of said base, pad means mounted to said vertically extending means on opposite sides of said base, a guide pad spaced from said pad means and extending on a line parallel to said pad means positioned on the opposite side of said cutting tool and secured to said base, said guide pad having a raised guide face sloping at a predetermined plane which extended coincides with the far edge of said cutting tool.

2. A portable motor-driven laminate chamfering machine as recited in claim 1, wherein said pad means are adjustable.

3. A portable motor-driven laminate chamfering machine as recited in claim 2, and means for adjustably mounting said pad means.

4. A portable motor-driven laminate chamfering machine as recited in claim 3, wherein said adjustably mounted pad means is pivotally mounted to said vertically extending means.

5. A portable motor-driven laminate chamfering machine as recited in claim 4, and means for limiting the downward movement of said adjustable pad means.

6. A portable motor-driven laminate chamfering machine as recited in claim 5, wherein said guide pad is fixed to said base.

7. A portable motor-driven laminate chamfering machine as recited in claim 1, and additionally means for gripping said machine for movement thereof.

* * * * *